US008543970B2

(12) United States Patent
Jaladeen et al.

(10) Patent No.: US 8,543,970 B2
(45) Date of Patent: Sep. 24, 2013

(54) ENERGY CONSUMPTION VISUALIZATION FOR SOFTWARE DESIGN

(75) Inventors: Ahamed Jaladeen, Bangalore (IN); Siddharth N. Purohit, Dallas, TX (US); Gandhi Sivakumar, Chennai (IN); Ram Viswanathan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 12/983,051

(22) Filed: Dec. 31, 2010

(65) Prior Publication Data

US 2012/0174059 A1 Jul. 5, 2012

(51) Int. Cl.
*G06F 9/44* (2006.01)
*G06F 9/45* (2006.01)

(52) U.S. Cl.
USPC ............ 717/105; 717/109; 717/113; 717/127

(58) Field of Classification Search
None
See application file for complete search history.

(56) References Cited

U.S. PATENT DOCUMENTS

2008/0074284 A1* 3/2008 Edwards et al. ......... 340/870.02
2011/0112875 A1* 5/2011 Johnson et al. .............. 705/7.11

* cited by examiner

*Primary Examiner* — Chuck Kendall
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for visualizing energy consumption for an architecture model of a component based software solution. In an embodiment of the invention, a method for visualizing energy consumption for an architecture model of a component based software solution is provided. The method includes selecting a deployment architecture for a solution of components in a modeling tool executing in memory of a computer and defining a deployment model of computing resources for the solution in the modeling tool. The method further includes establishing performance parameters for the components and computing power consumption for the computing resources based upon utilization and an expected utilization of the computing resources by the components for the selected deployment architecture. Finally, the method includes displaying the computed power consumption in the modeling tool.

12 Claims, 2 Drawing Sheets

ENERGY CONSUMPTION VISUALIZATION FOR SOFTWARE DESIGN

BACKGROUND OF THE INVENTION

1. Field of the Invention

The present invention relates to software design for component based computing solutions and more particularly to visual modeling of a component based architecture.

2. Description of the Related Art

As businesses and consumers become further interconnected through computer communications networks such as the global Internet and local intranets, the commerce sites and companion computing applications which integrate interactions between businesses and consumers alike are becoming ever more complex. Addressing the explosion of business to business and business to consumer interactions on-line, information technologists increasingly focus on architecting and implementing complete commerce site solutions to reflect the entire life cycle of a business in lieu of integrating multiple, disparate applications which when combined reflect the business life cycle. Consequently, as modern commerce sites can be both large and distributed, commerce systems have been configured to deploy complete e-commerce systems in as seamless a fashion as possible.

It is now a common trend that traditional, stand-alone, commerce oriented applications are produced from one or more components which can be individually re-used to create business processes for different solutions. Each of these components can expose itself as a set of reusable business functions, also referred to as "services" comporting with computing standards for deploying enterprise level logic that facilitate an open service oriented architecture (SOA). An SOA essentially can be defined as a system where all exposed business and technical functions are in the form of reusable services. These reusable services can communicate with each other to engage either in simple data passing between two or more services, or in activity coordination by two or more services.

In a SOA, a client can invoke an operation on a service to perform a function and, optionally the client can receive a response. Invoked services are generally business functions configured to fulfill the needs of business customers, whether those customers are individual consumers or other businesses. The functions can be grouped into various services where each service can specialize in functions such as catalog management, shopping cart management, credit card transaction processing, sales tax computation and the like. By utilizing an SOA, services in a commerce solution can interoperate with other business processes in a larger commerce solution involving one or more separate business entities and one or more separate consumer entities.

The design and development of traditional and SOA components and solutions currently is mainly focused on addressing the functional and non-functional aspects like performance, availability, security and the like. For example the architecture analysis may focus on optimizing the granularity of a particular component, the layering of the components appropriately, ensuring high cohesion of the component, ensuring loose coupling, defining decisions to have for example one operation per service component or multiple per service component, and forming the modules to be hosted in virtual machines and related bindings. Yet, the foregoing elements focus upon the nature of the model to be deployed and not the consumption of energy resulting from the deployment of the model. Studies have shown that for maintaining the energy of one kilowatt per hour released in a data center hosting a computing cluster supporting a component based solution, seven tenths to eight tenths of a kilowatt hour will be consumed in supporting cooling of the data center.

BRIEF SUMMARY OF THE INVENTION

Embodiments of the present invention address deficiencies of the art in respect to modeling a component based solution and provide a novel and non-obvious method, system and computer program product for visualizing energy consumption for an architecture model of a component based software solution. In an embodiment of the invention, a method for visualizing energy consumption for an architecture model of a component based software solution of components is provided. The method includes selecting a deployment architecture in a modeling tool executing in memory of a computer and defining a deployment model of computing resources for the solution in the modeling tool. The method further includes establishing performance parameters for the components and computing power consumption for the computing resources based upon the utilization and an expected utilization of the computing resources for the selected components. Finally, the method includes displaying the computed power consumption in the modeling tool.

In another embodiment of the invention, a software architecture modeling data processing system is provided. The system includes a host computer with at least one processor and memory and a modeling tool executing in the memory of the host computer. Finally, an energy analysis module is coupled to the modeling tool. The energy analysis module includes program code that when executed in the memory of the host computer computes an expected power consumption for a selected arrangement of components of a solution to be executed in a particular deployment architecture expecting particular utilization of the components as set forth in the modeling tool.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for visualizing energy consumption for an architecture model of a component based software solution. In accordance with an embodiment of the invention, a component based software solution such as a SOA based computing solution can be architected within a modeling tool. Specifically, different software components can be selected and arranged in a visual canvas of the modeling tool to perform a computing operation. An underlying deployment architecture further can be specified in the canvas to support the arrangement of software components. In this regard, different underlying computer processing resources can be matched to different ones of the components in which the components will execute. Subsequently, energy consumption for each of the processing resources can be computed based upon the prospective load of the matched different ones of the components and displayed in the modeling tool. In this way, different arrangements of software components and different underlying deployment architectures resulting in different energy consumption outcomes can be visualized during the course of architecting the component based solution.

Figure 1:
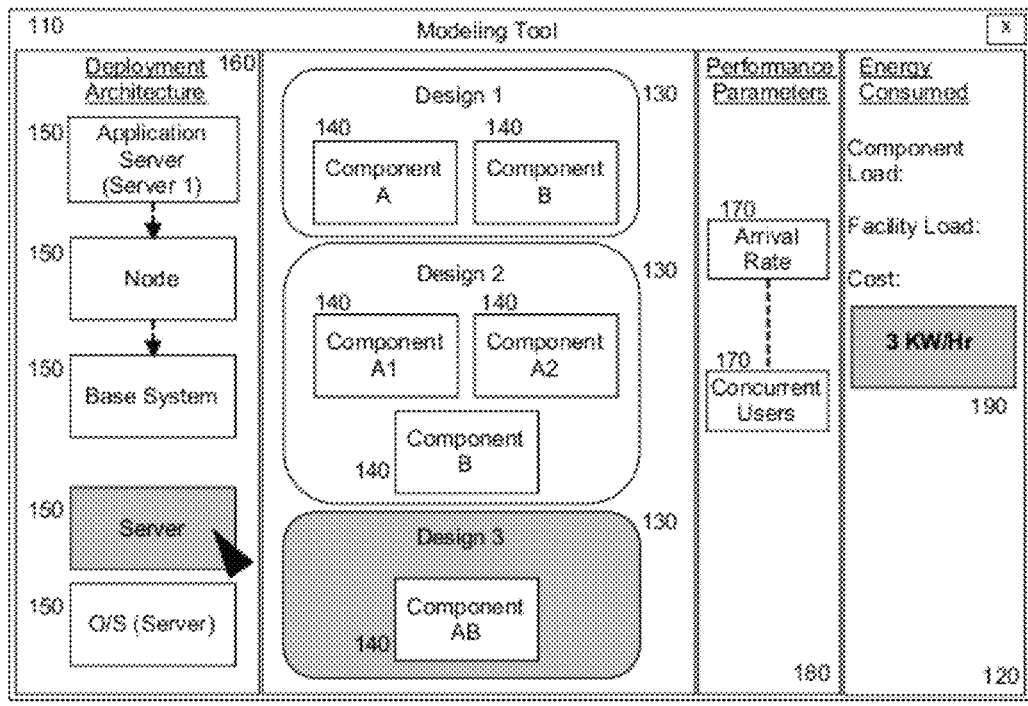
FIG. 1 is a pictorial illustration of a process for visualizing energy consumption for an architecture model of a component based software solution.

In further illustration, FIG. 1 is a pictorial illustration of a process for visualizing energy consumption for an architecture model of a component based software solution. As shown in FIG. 1, a modeling tool 110 can be provided in which different deployment architectures 130 can be defined to include one or more different components 140 to achieve a logical objective of a software application in a component based solution such as a SOA type solution. In this regard, the arrangement of components can vary as shown in FIG. 1 from the more granular in which different sub-operations for an operation of the logical objective are provided for by separate components to the less granular in which all operations of the logical objective are provided by a single component.

A deployment architecture 160 further can be defined within a canvas of the modeling tool 110 in which different resources 150 are provided to support the execution of the operations of the components 140 on a selected deployment architecture 130. In this regard, the resources can set forth a computing system of one or more computing nodes wherein the computing nodes include one or more application servers acting individually as containers in which the components 140 can execute. The system itself can reside in one or more servers utilizing one or more operating systems either directly "on bare metal" or virtually within respective virtual machines of a single server. Of import, the power consumption rate of the resources 150 will be known a priori to the modeling tool 110 and can be manually specified by an end user configuring the deployment architecture 160 or the individual resources 150 prior to defining the deployment architecture 160.

The modeling tool 110 yet further can permit the specification in a performance parameters pane 180 of different performance parameters 170 for the components. Those different performance parameters 170 can include, for instance, an expected arrival rate of requests for the component, and a number of concurrent users of the component. Finally, an energy analysis 120 can be provided in the modeling tool 110 and can include at the minimum an expected consumption of power 190 computed by accounting for the known power consumption rate of the resources 150, and the expected utilization of the resources 150 based upon the different performance parameters of the components. In this way, as the end user selects different deployment architectures 130 for the components, energy utilization for each selected different deployment architecture 130 can be visualized by the end user.

Figures 2, 3:
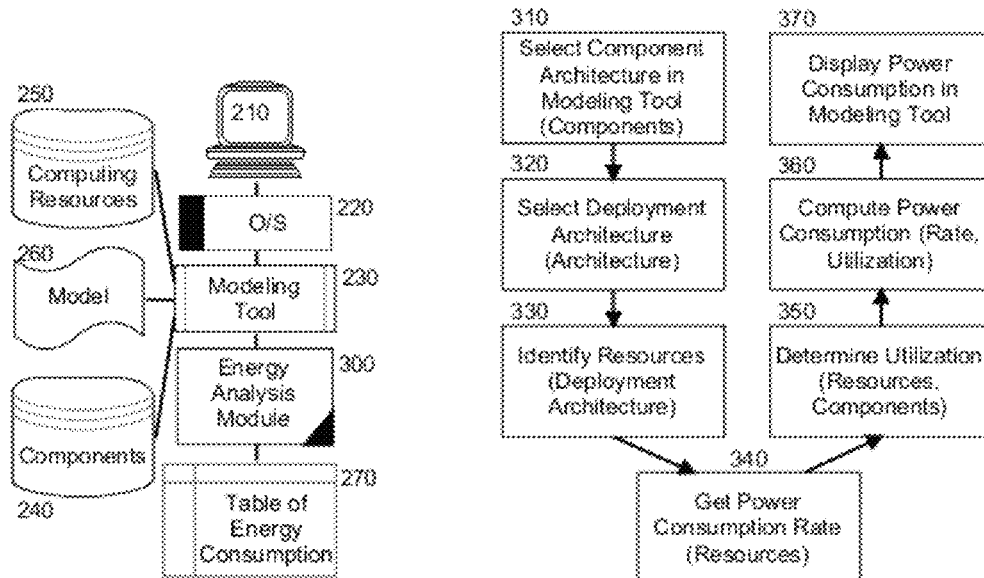
FIG. 2 is a schematic illustration of a software architecture modeling data processing system configured for visualizing energy consumption for an architecture model of a component based software solution.
FIG. 3 is a flow chart illustrating a process for visualizing energy consumption for an architecture model of a component based software solution

The process described in connection with FIG. 1 can be implemented within a software modeling data processing system. In yet further illustration, FIG. 2 schematically shows a software architecture modeling data processing system configured for visualizing energy consumption for an architecture model of a component based software solution. The system can include a host computer 210 with at least one processor and memory supporting the execution of an operating system 220. The operating system 220 in turn can host the operation of a modeling tool 230. Both a data store of computing resources 250 available for modeling in the modeling tool 230, as well as a data store of components 240 defined for arrangement in the modeling tool 230 can be provided for use in the modeling tool 230. Consequently, different components can be arranged for execution in a particular deployment architecture to define a component in a SOA or non-SOA computing solution 260.

Of note, an energy analysis module 300 can be coupled to the modeling tool 230. The energy analysis module 300 can include program code that when executed in the memory of the host computer 210, can compute an expected power consumption for a selected arrangement of a components of a solution in a selected deployment architecture for the solution to be executed in a particular deployment architecture expecting particular utilization of the component as set forth in the modeling tool 230. To facilitate the computation performed by the energy analysis module 300, a table of energy consumption 270 can be included in the system that specifies known power consumption rates for the different computing resources based on the utilization of the components defined in the data store of computing resources 250.

In even yet further illustration of the operation of the energy analysis module, FIG. 3 is a flow chart illustrating a process for visualizing energy consumption for an architecture model of a component based software solution. Beginning in block 310, a deployment architecture of one or more components can be selected in a canvas of the modeling tool. In block 320, a deployment architecture of different computing resources for hosting the deployment of the components for the solution can be selected. In block 330, the computing resources requisite to the deployment architecture can be identified and in block 340, a power consumption rate can be retrieved for each of the computing resources.

In block 350, an expected utilization of the computing resources can be determined as specified in the modeling tool, such as an expected arrival rate of requests to the component and a number of concurrent users supported for the component. In block 360, an expected power consumption of the computing resources can be computed according to the expected utilization of the computing resources by the components and the power consumption rate retrieved for each of the computing resources. Finally, in block 370 the expected power consumption for the selected deployment architecture can be displayed in the modeling tool. In this way, an energy model can be provided in concert with the architecting of a component based computing solution like a SOA based computing solution and "what-if" analyses can be performed by "on the fly" by sequentially selecting different deployment architectures and different components for the solution in the modeling tool.

Figure 4:
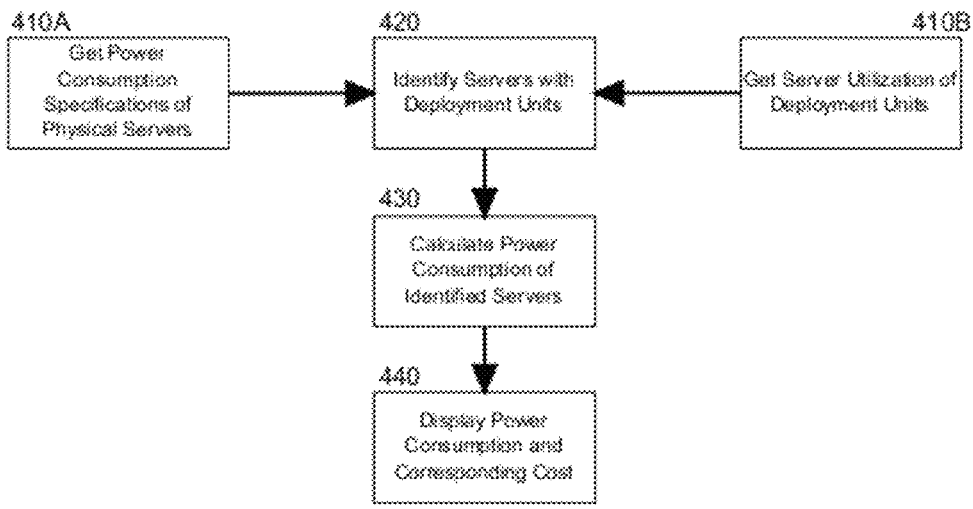
FIG. 4 is a flow chart illustrating a process for computing and visualizing energy consumption and corresponding cost for an architecture model of a component based software solution; and, FIG. 5 is a flow chart illustrating a process for computing and visualizing energy consumption and corresponding cost for an architecture model of a component based software solution according to localized power rates and tariffs.

In more particular illustration, FIG. 4 is a flow chart illustrating a process for computing and visualizing energy consumption and corresponding cost for an architecture model of a component based software solution. Beginning in block 410A and 410B, both power consumption specifications of the physical servers to be used in deploying the solution, as well as known server utilization of deployment units for the servers can be loaded. In block 420, individual ones of the physical servers can be associated with different deployment units. In block 430, the power consumption of the associated servers can be calculated according to the loaded power consumption specifications of the physical servers and the known server utilization of deployment units. Finally, in block 440, the power consumption and corresponding cost of the deployment units utilizing the associated physical servers can be displayed along with a corresponding cost.

Figure 5:
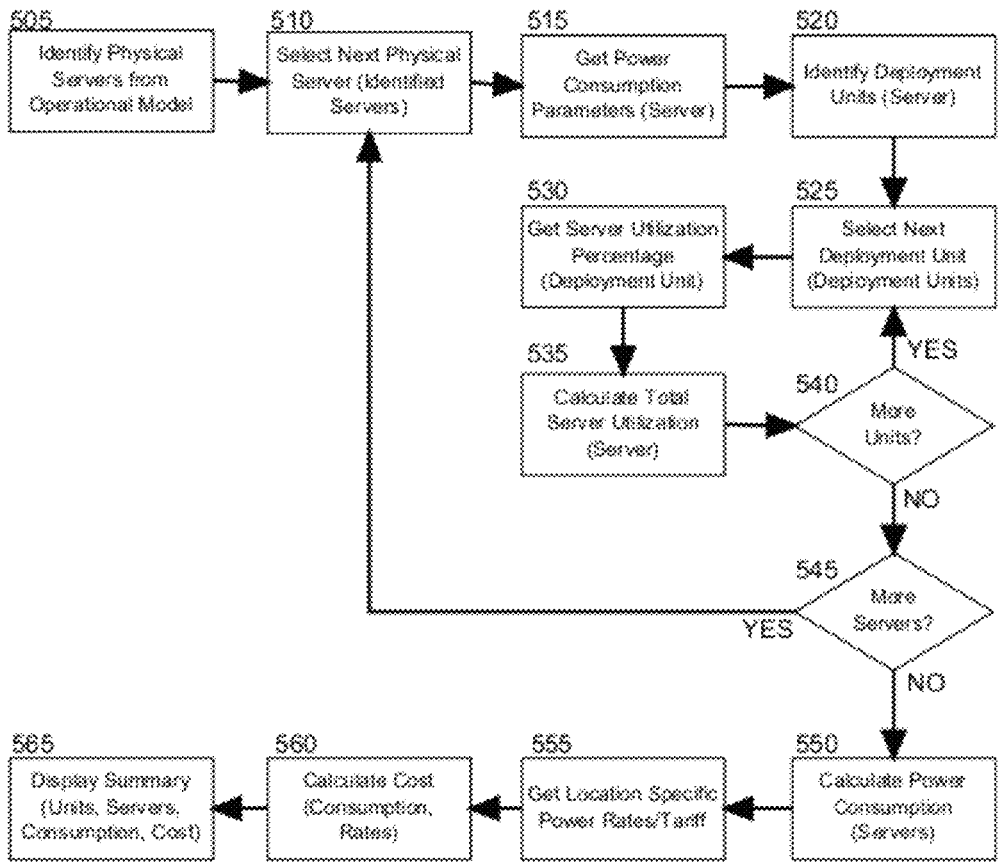

In even yet further illustration, FIG. 5 is a flow chart illustrating a process for computing and visualizing energy consumption and corresponding cost for an architecture model of a component based software solution according to localized power rates and tariffs. Beginning in block 505, a selection of physical servers from an operational model can be identified and a first of the physical servers in the selection can be selected for processing in block 510. In block 515, power consumption parameters from the vendor provided specifications for the selected physical server can be retrieved and in block 520, one or more deployment units to be deployed to the selected physical server can be identified.

In block 525, a first of the deployment units to be deployed to the selected physical server can be selected for processing and in block 530, a server utilization percentage expected of the selected deployment unit can be retrieved. In block 535, a total cumulative server utilization can be calculated for the selected physical server. Thereafter, in decision block 540, if additional deployment units remain to be processed, the process can repeat through block 525. When no more deployment units remain to be processed, in decision block 545, it can be determined whether additional physical servers remain to be processed. If so, the process can repeat through block 510. Otherwise, the process can continue through block 550.

In block 550, a total power consumption of all physical servers can be computed. Also, in block 555, the location specific tariff rates for power consumption can be retrieved for the proposed location of the physical servers. Thereafter, the total cost of power consumption can be computed for all of the physical servers using the retrieved rates. Finally, in block 565 a summary can be displayed including the deployment units, the physical servers utilized by the deployment units and the computed costs of power consumption.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for visualizing energy consumption for an architecture model of a component based software solution, the method comprising:
   providing a modeling tool executing in memory of a computer, wherein different deployment architectures are defined in the modeling tool to include one or more different components to achieve a logical objective of a software application in a component based solution;
   selecting a deployment architecture from the different deployment architectures in the modeling tool;
   defining a deployment model of computing resources for the selected deployment architecture;
   establishing performance parameters for components of the selected deployment architecture;
   computing power consumption for the computing resources based upon the established performance parameters of the components and an expected utilization of the computing resources by the components for the selected deployment architecture; and,
   displaying the computed power consumption in the modeling tool.

2. The method of claim 1, wherein the component based solution is a service oriented architecture (SOA) based solution.

3. The method of claim 1, wherein establishing performance parameters for the component, comprises establishing an expected arrival rate of requests for the component, and a number of concurrent users of the component defined by non-functional requirements of the solution.

4. The method of claim 1, wherein computing power consumption for the computing resources based upon the established performance parameters of the components and an expected utilization of the computing resources for the selected deployment architecture, comprises computing power consumption for the computing resources based upon a known power consumption rate for the computing resources, and an expected utilization of the computing resources by the components for the selected deployment architecture.

5. The method of claim 1, further comprising:
   selecting a different deployment architecture for the solution in the modeling tool;
   computing a new power consumption for the computing resources based upon the established performance parameters of the components and an expected utilization of the computing resources by the components for the selected different deployment architecture; and,
   displaying the new computed power consumption in the modeling tool.

6. A software architecture modeling data processing system comprising:
   a host computer with at least one processor and memory, the processor being configured to perform:
      providing a modeling tool executing in memory of a computer, wherein different deployment architectures are defined in the modeling tool to include one or more different components to achieve a logical objective of a software application in a component based solution;
      selecting a deployment architecture from the different deployment architectures in the modeling tool;
      defining a deployment model of computing resources for the selected deployment architecture;
      establishing performance parameters for components of the selected deployment architecture;

computing power consumption for the computing resources based upon the established performance parameters of the components and an expected utilization of the computing resources by the components for the selected deployment architecture; and, displaying the computed power consumption in the modeling tool.

7. The system of claim 6, wherein the component based solution is a service oriented architecture (SOA) based solution.

8. A computer program product for visualizing energy consumption for an architecture model of a component based software solution, the computer program product comprising:

a computer readable storage medium having computer readable program code embodied therewith, the computer readable program code comprising:

computer readable program code for providing a modeling tool executing in memory of a computer, wherein different deployment architectures are defined in the modeling tool to include one or more different components to achieve a logical objective of a software application in a component based solution;

computer readable program code for selecting a deployment architecture from the different deployment architectures in the modeling tool;

computer readable program code for defining a deployment model of computing resources for the selected deployment architecture;

computer readable program code for establishing performance parameters for components of the selected deployment architecture;

computer readable program code for computing power consumption for the computing resources based upon the established performance parameters of the components and an expected utilization of the computing resources by the components for the selected deployment architecture; and, computer readable program code for displaying the computed power consumption in the modeling tool.

9. The computer program product of claim 8, wherein the component based solution is a service oriented architecture (SOA) based solution.

10. The computer program product of claim 8, wherein the computer readable program code for establishing performance parameters for the component, comprises computer readable program code for establishing an expected arrival rate of requests for the component, and a number of concurrent users of the component defined by non-functional requirements of the solution.

11. The computer program product of claim 8, wherein the computer readable program code for computing power consumption for the computing resources based upon the established performance parameters of the components and an expected utilization of the computing resources by the components for the selected deployment architecture, comprises computer readable program code for computing power consumption for the computing resources based upon a known power consumption rate for the computing resources, and an expected utilization of the computing resources by the components for the selected deployment architecture.

12. The computer program product of claim 8, further comprising:

computer readable program code for selecting a different deployment architecture for the solution in the modeling tool;

computer readable program code for computing a new power consumption for the computing resources based upon the established performance parameters of the components and an expected utilization of the computing resources by the components for the selected different deployment architecture; and, computer readable program code for displaying the new computed power consumption in the modeling tool.

\* \* \* \* \*